US009520738B2

United States Patent
Rejman et al.

(10) Patent No.: US 9,520,738 B2
(45) Date of Patent: Dec. 13, 2016

(54) INDUCTIVE CHARGING DEVICE FOR A BATTERY DEVICE

(71) Applicant: Robert Bosch GmbH, Stuttgart (DE)

(72) Inventors: Marcin Rejman, Waiblingen (DE); Guenter Lohr, Leinfelden-Echterdingen (DE); Juergen Mack, Goeppingen (DE); Dragan Krupezevic, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 225 days.

(21) Appl. No.: 14/134,582

(22) Filed: Dec. 19, 2013

(65) Prior Publication Data

US 2014/0176064 A1    Jun. 26, 2014

(30) Foreign Application Priority Data

Dec. 21, 2012  (DE) .......................... 10 2012 112 887

(51) Int. Cl.
*H02J 7/02*    (2016.01)
*H02J 7/00*    (2006.01)

(52) U.S. Cl.
CPC .............. *H02J 7/025* (2013.01); *H02J 7/0042* (2013.01)

(58) Field of Classification Search
CPC ....................................................... H02J 7/025
USPC ......................................................... 320/108
See application file for complete search history.

(56) References Cited

U.S. PATENT DOCUMENTS

| 9,112,364 B2 * | 8/2015 | Partovi ................... H02J 7/025 |
| 2011/0241607 A1 * | 10/2011 | Wiegers .................. H02J 7/025 320/108 |
| 2012/0235636 A1 * | 9/2012 | Partovi ................... H02J 7/025 320/108 |
| 2012/0313742 A1 * | 12/2012 | Kurs ...................... B60L 11/182 336/180 |
| 2014/0176064 A1 * | 6/2014 | Rejman ................... H02J 7/025 320/108 |

\* cited by examiner

*Primary Examiner* — Richard Isla Rodas
*Assistant Examiner* — Dung V Bui
(74) *Attorney, Agent, or Firm* — Norton Rose Fulbright US LLP; Gerard Messina

(57) ABSTRACT

A charging system for a battery device of a handheld tool includes a charging device provided to inductively charge the battery device in a charging operation, the charging device having at least one induction charging unit which has at least one charging coil having a main coil extension. A gap is provided between the battery device and the charging device in a charging operation. A ratio between (i) the at least one main coil extension and (ii) a minimum clearance between the at least one charging coil and a surface defining the gap is at most 30/1.

4 Claims, 3 Drawing Sheets

INDUCTIVE CHARGING DEVICE FOR A BATTERY DEVICE

BACKGROUND OF THE INVENTION

1. Field of the Invention

The present invention relates to a charging system for a battery device of a handheld tool.

2. Description of the Related Art

A system has already been provided having a battery device, in particular a handheld tool battery device, having a charging device, which in a charging operation is provided to transmit a charging energy inductively to the battery device, having at least one induction charging unit, which has at least one charging coil having a main coil extension, and having a contact area, which in a charging operation is situated between the battery device and the charging device.

BRIEF SUMMARY OF THE INVENTION

The present invention provides a system having a battery device, in particular a handheld tool battery device, having a charging device, which in a charging operation is provided to transmit a charging energy inductively to the battery device, having at least one induction charging unit, which has at least one charging coil having a main coil extension, and having a contact area, which is situated in a charging operation between the battery device and the charging device.

The present invention provides for a ratio between the at least one main coil extension and a minimum clearance between the at least one charging coil and the contact area to be at most 30/1. A ratio between the at least one main coil extension and a minimum clearance between the at least one charging coil and the contact area is advantageously at most 25/1. A "battery device" is to be understood in this context in particular as a device for the temporary storage of electrical energy, in particular an accumulator. Preferably, this is to be understood in particular as a rechargeable storage device. Various battery devices that seem useful to one skilled in the art are conceivable, but in the present case the battery device is to be understood in particular as a lithium-ion accumulator. Furthermore, a "handheld tool battery device" in this connection is to be understood in particular as a battery device for a handheld machine tool. A "handheld machine tool" in this instance is to be understood in particular as a workpiece-machining machine tool, advantageously a drilling machine, a drilling and/or percussion hammer, a saw, a plane, a screwdriver, a milling tool, a grinder, an angle grinder, a gardening device and/or a multifunctional tool. A "charging device" is to be understood in this context in particular as a device for charging battery devices, in particular accumulators. The device preferably has at least one control and/or regulating unit, which is provided to control and/or regulate a charging process. Particularly preferably this is to be understood as an induction charging device. Furthermore, in this connection, a "charging operation" is to be understood in particular as an operating state in which the cell unit of the battery device is supplied with energy externally. Preferably, this is to be understood in particular as an operating state, in which the cell unit of the battery device temporarily stores the energy supplied externally. "Provided" is to be understood in particular as programmed, designed and/or equipped. An "induction charging unit" in this connection is to be understood in particular as a unit that is provided to convert electrical energy into a magnetic field or a magnetic field into electrical energy. Preferably, this is to be understood as a part of an induction charging device that is provided to transmit energy, in particular at least partially contactlessly, by induction from a charging device to a battery device. The induction charging unit particularly preferably has at least one charging coil. A "charging coil" in this context is to be understood in particular as an element that is made up at least partially of an electrical conductor, in particular a wound electrical conductor, which is disposed at least partially in the form of a circular disk. Preferably, a voltage is induced in the electrical conductor when a magnetic field is applied. A "main coil extension" is to be understood in this context in particular as an extension of a longest edge of a smallest geometrical rectangular parallelpiped, which just barely still encloses the charging coil in its entirety. Furthermore, in this connection, a "contact area" is to be understood in particular as an area between the battery device and the charging device, in particular in a charging operation. Preferably this is to be understood as an area that is bounded by mutually facing sides of the battery device and the charging device. Particularly preferably, this is to be understood in particular as an area in which the battery device and the charging device touch at least to a large extent directly. In this context, "at least to a large extent" is to be understood in particular as at least 50%, preferably at least 70% and very preferably at least 90% of the whole. Furthermore, in this context, a "ratio" is to be understood in particular as a ratio of dimensions. Preferably, this is to be understood in particular as a ratio of dimensions between two in particular rectilinear extensions. A "minimum clearance" is to be understood in this connection in particular as a clearance that is described by a shortest vector that just barely still touches the charging coil and the contact area.

The development of the system according to the present invention is able to achieve an advantageous dimensioning and/or positioning of the at least one induction charging unit. Furthermore, an advantageously low field intensity may thereby be achieved in a contact area, whereby in turn a low magnetic field on foreign objects, in particular on small foreign objects in the contact area, may be achieved. This in turn makes it possible for example to prevent foreign objects from heating up in the contact area and from damaging the system and/or endangering an operator. A "small foreign object" is to be understood in this context in particular as a foreign object having a volume of less than or equal to 0.5 $cm^3$, preferably less than or equal to 0.3 $cm^3$ and particularly preferably less than or equal to 0.2 $cm^3$.

The present invention further provides for the battery device to include the at least one induction charging unit. The induction charging unit of the battery device is preferably represented by a secondary induction charging unit. This makes it possible to provide an advantageous battery device. Furthermore, a heating up of foreign objects in a surrounding area of the battery device is thereby preventable.

The present invention furthermore provides for the charging device to include the at least one induction charging unit. The induction charging unit of the charging device is preferably represented by a primary induction charging unit. This makes it possible to provide an advantageous charging device. Furthermore, this makes it possible to prevent foreign objects on the charging device from being heated up by the charging device in a charging process.

The present invention furthermore provides for the system to have at least one additional induction charging unit, which has at least one charging coil having a main coil extension, a ratio between the at least one main coil extension and a minimum clearance between the at least one charging coil and the contact area being at most 30/1. The induction charging units are preferably developed to be at least partially identical. Particularly preferably, at least one of the induction charging units forms a primary induction charging unit and at least one of the induction charging units forms a secondary induction charging unit. A "secondary induction charging unit" in this connection is to be understood in particular as an induction charging unit that is provided to convert a magnetic field into electrical energy. Furthermore, a "primary induction charging unit" in this connection is to be understood in particular as an induction charging unit that is provided to convert electrical energy into a magnetic field which may be converted again into electrical energy by the secondary induction charging unit. A particularly advantageous energy transmission may thereby be achieved from one of the at least two induction charging units to another of the at least two induction charging units. Furthermore, a particularly advantageously low field intensity in a contact area may be ensured.

The present invention further provides for the battery device and the charging device respectively to include at least one of the induction charging units. This makes it possible to provide an advantageous battery device and charging device. Furthermore, in particular a heating up of foreign objects, in particular between the battery device and the charging device, is thereby preventable.

The present invention furthermore provides for a ratio between the at least one main coil extension and the minimum clearance between the at least one charging coil and the contact area to be at least 7/1. A ratio between the at least one main coil extension and a minimum clearance between the at least one charging coil and the contact area is preferably at least 10/1. It is thereby possible to achieve an advantageous dimensioning and/or positioning of the at least one induction charging unit. Furthermore, it is possible to ensure an advantageously high energy transmission through the induction charging unit.

The present invention furthermore provides for a ratio between the at least one main coil extension and the minimum clearance between the at least one charging coil and the contact area to be between 20/1 and 14/1. It is thereby possible to achieve a particularly advantageous dimensioning and/or positioning of the at least one induction charging unit. It is thereby possible to ensure a high energy transmission through the induction charging unit at a low field intensity in a contact area.

The present invention furthermore provides for the battery device to have at least in a charging operation a charging current of at least 1 ampere. The charging device preferably has at least in a charging operation a charging current of at least approximately 2 ampere. It is thereby possible to provide a particularly advantageous charging current, which in turn achieves an advantageous charging process. Furthermore, an advantageous field intensity may thereby be achieved.

The present invention furthermore provides for the battery device to have at least in a charging operation a charging voltage of at least 10.7 volt, preferably of at least 14.4 volt and particularly preferably of at least 18 volt. It is thereby possible to provide a particularly advantageous charging voltage, which in turn achieves an advantageous charging process. Particularly in conjunction with the charging current, a particularly advantageous energy transmission may be achieved.

The present invention furthermore provides for the charging device to include the induction charging unit, which has at least one charging coil having a main coil extension of at least 50 mm. The induction charging unit preferably has at least one charging coil having a main coil extension of at least 60 mm. The induction charging unit particularly preferably has at least one charging coil having a main coil extension of at least 70 mm. Particularly preferably, the induction charging unit is represented by the primary induction charging unit. This makes it possible to achieve a particularly advantageous induction charging unit. Furthermore, particularly in conjunction with the ratio, it is possible to achieve an advantageous magnetic field for energy transmission.

The system according to the present invention in this connection should not be restricted to the application and specific embodiment described above. In order to fulfill a method of functioning described herein, the system according to the present invention may in particular have a number of individual elements, components and units that deviates from a number mentioned herein.

DETAILED DESCRIPTION OF THE INVENTION

Figure 1:
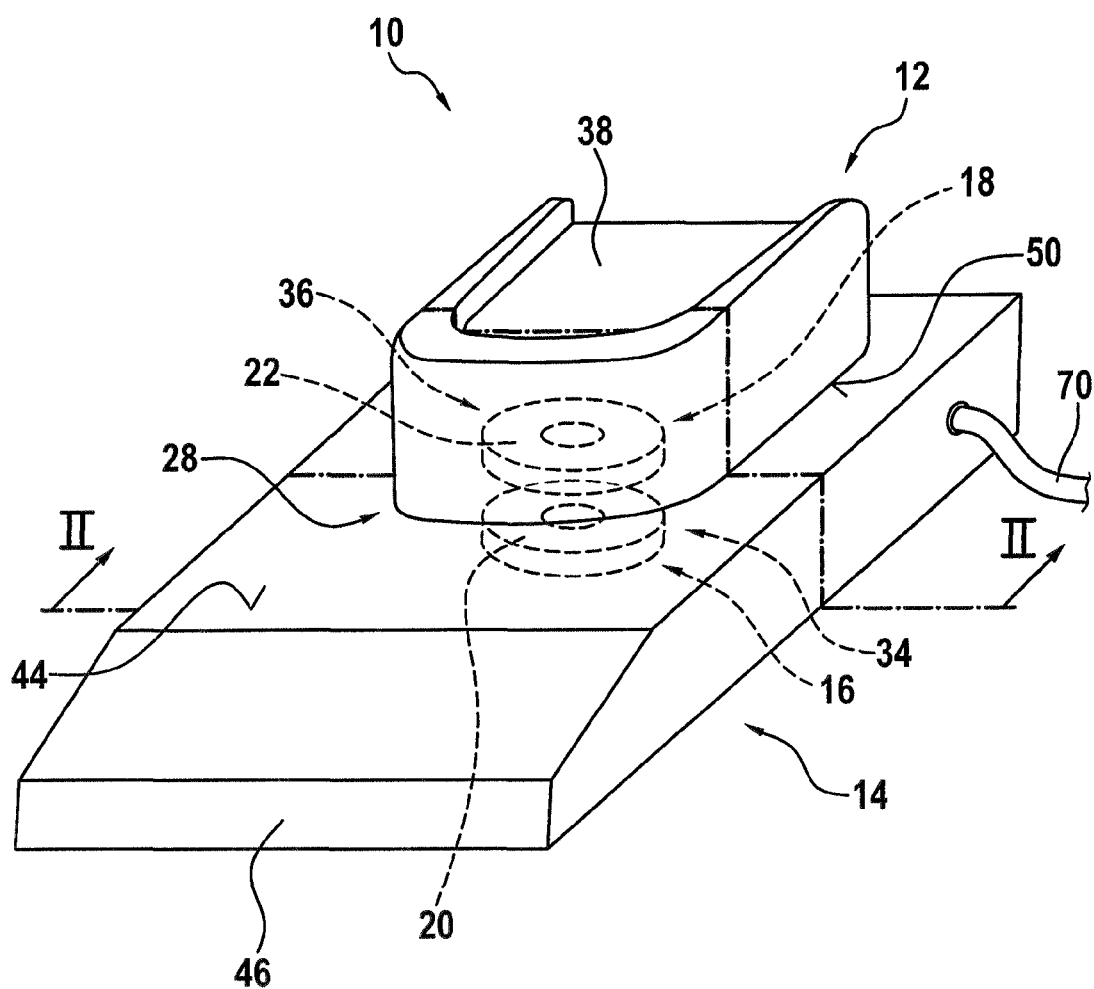
FIG. 1 shows a system according to the present invention having a battery device, having a charging device, having a contact area and having two induction charging units in a charging operation, in a schematic view.
Figure 2:
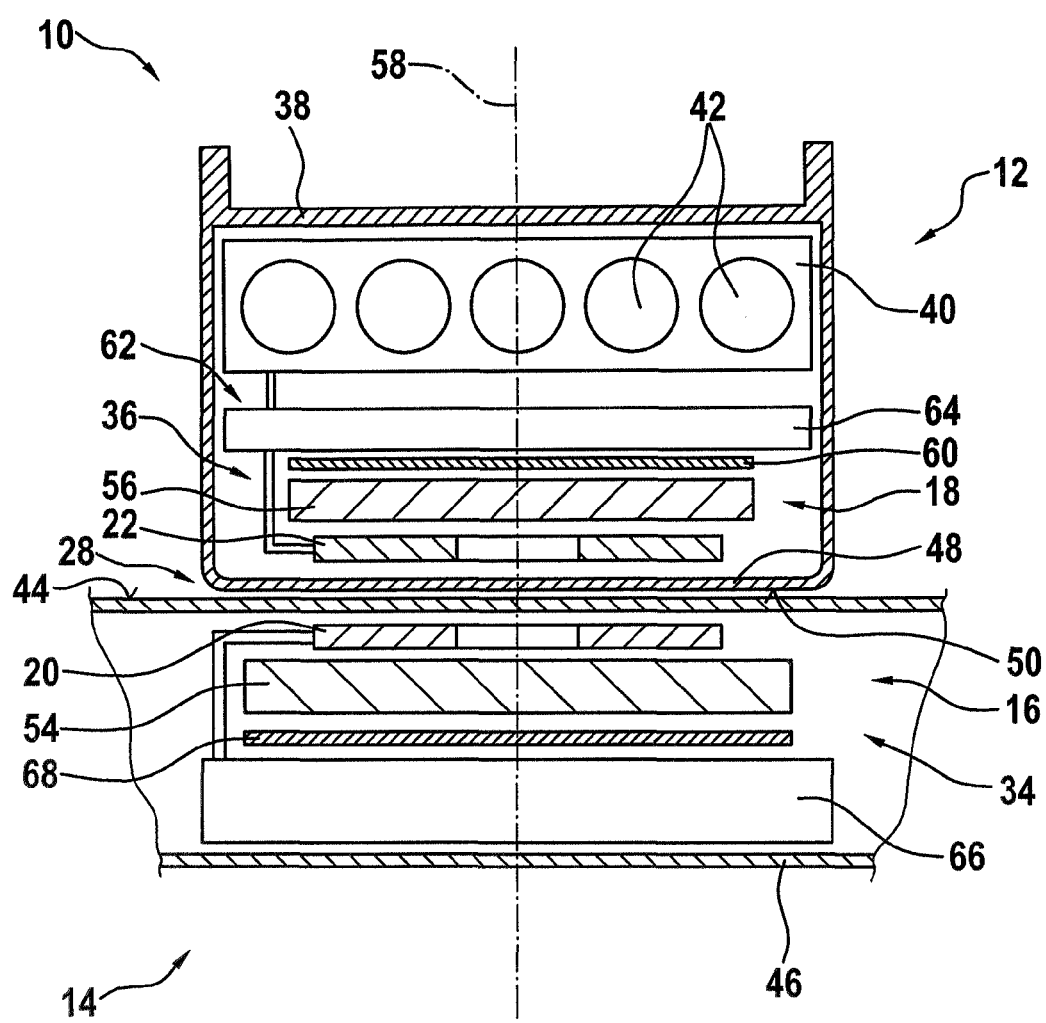
FIG. 2 shows a subsection of system according to the present invention in a charging operation, in a schematic sectional view at line of intersection II.

FIG. 1 shows a system 10 according to the present invention having a battery device 12, having a charging device 14, having a contact area 28 and having two induction charging units 16, 18 in a charging operation. Battery device 12 is represented by a handheld tool battery device. Battery device 12 has a housing unit 38. Housing unit 38 has a housing wall 48, which forms a bottom surface 50. In addition, battery device 12 has a cell unit 40. Cell unit 40 is provided for storing energy. Furthermore, cell unit 40 is provided to supply a handheld machine tool (not shown) with energy. Cell unit 40 is situated in housing unit 38. Cell unit 40 has five cell elements 42. Cell elements 42 of cell unit 40 are connected in series (FIG. 2). Cell elements 42 are furthermore formed respectively by lithium-ion cells.

In a charging operation, battery device 12 is set up on a charging surface 44 of charging device 14. In a charging operation, charging device 14 is provided to charge battery device 12. Battery device 12 sits with bottom surface 50 on charging surface 44. Charging area 44 forms a part of a housing unit 46 of charging device 14. On a provided stand, charging surface 44 extends parallel to a subsurface and faces away from a subsurface. Charging surface 44 is provided to accommodate battery device 12 for a charging process.

In a charging operation, contact area 28 is situated between battery device 12 and charging device 14. Contact area 28 is situated between bottom surface 50 of housing unit 38 of battery device 12 and the charging surface 44 of charging device 14. Contact area 28 is formed by a gap between battery device 12 and charging device 14. Foreign objects may collect in contact area 28 in operation. This is illustrated by a foreign object 52. Foreign object 52 is represented by small metal part.

The two induction charging units 16, 18 respectively have a charging coil 20, 22 having a main coil extension 24, 26. Induction charging units 16, 18 furthermore each have a core unit 54, 56. Charging coils 20, 22 are respectively developed in the form of a ring. Charging coil 20, 22 are respectively made up of a plurality of electrical conductors, which extend in the circumferential direction. The electrical conductors of charging coils 20, 22 are wound in the circumferential direction about a winding axis 58 (FIG. 2). The main coil extension 24, 26 of charging coils 20, 22 respectively runs perpendicular to winding axis 58. Core units 54, 56 are respectively developed in the form of a plate and are made from a magnetic material.

Battery device 12 has one induction charging unit 18 of the two induction charging units 16, 18. Induction charging unit 18 of battery device 12 is represented by a secondary induction charging unit 36. Induction charging unit 18 of battery device 12 is provided for charging cell unit 40. Induction charging unit 18 is provided for wireless energy transmission for a charging process of cell unit 40. Induction charging unit 18 includes charging coil 22 and core unit 56. Induction charging unit 18 is situated within housing unit 38 of battery device 12. Induction charging unit 18 is situated between cell unit 40 and housing wall 48 of housing unit 38. In the direction of cell unit 40, housing wall 48 is followed first by charging coil 22 of induction charging unit 18, then by core unit 56 of induction charging unit 18, by a screening unit 60 and an electronics unit 62. Screening unit 60 is provided to protect electronics unit 62 from interference effects of charging coil 22, and vice versa.

Electronics unit 62 has a charging electronics system 64. Furthermore, electronics unit 62 has a circuit board (not shown), on which the charging electronics system 64 is situated. Charging electronics system 64 is connected to cell unit 40 via a conductor. Charging electronics system 64 is also connected to charging coil 22 via a conductor (FIG. 2).

Charging device 14 also has one induction charging unit 16 of the two induction charging units 16, 18. Induction charging unit 16 of the charging device is represented by a primary induction charging unit. Induction charging unit 16 is provided for transmitting energy. Induction charging unit 16 is provided for wireless energy transmission from charging device 14 to battery device 12. Induction charging unit 16 is provided to convert electrical energy to a magnetic field which is able to be reconverted to electrical energy by induction charging unit 18 of battery device 12. Induction charging unit 16 includes charging coil 20. Charging coil 20 is developed to be annular. Charging coil 20 has the main coil extension 24 of 70 mm. Induction charging unit 16 furthermore includes core unit 54 and an electronics unit 66. Core unit 54 is developed in a plate-shaped manner and is made up of a magnetic material. Induction charging unit 16 is situated entirely in housing unit 46. In the direction of a center of charging device 14, charging surface 44 of housing unit 46 is followed first by charging coil 20 of induction charging unit 16, then by core unit 54 of induction charging unit 16, by a screening unit 68 and electronics unit 66. Screening unit 68 is provided to protect electronics unit 66 from interference effects of charging coil 20, and vice versa. Electronics unit 66 is connected to a cable 70 for supplying energy, in a manner not shown in more detail.

In a charging operation, battery device 12 has a charging current of approximately 2 ampere. In a charging operation, battery device 12 additionally has a charging voltage of approximately 21 volt. The charging current and the charging voltage are applied on cell unit 40. The charging current and the charging voltage are transmitted inductively from charging device 14 to battery device 12.

Figure 3:
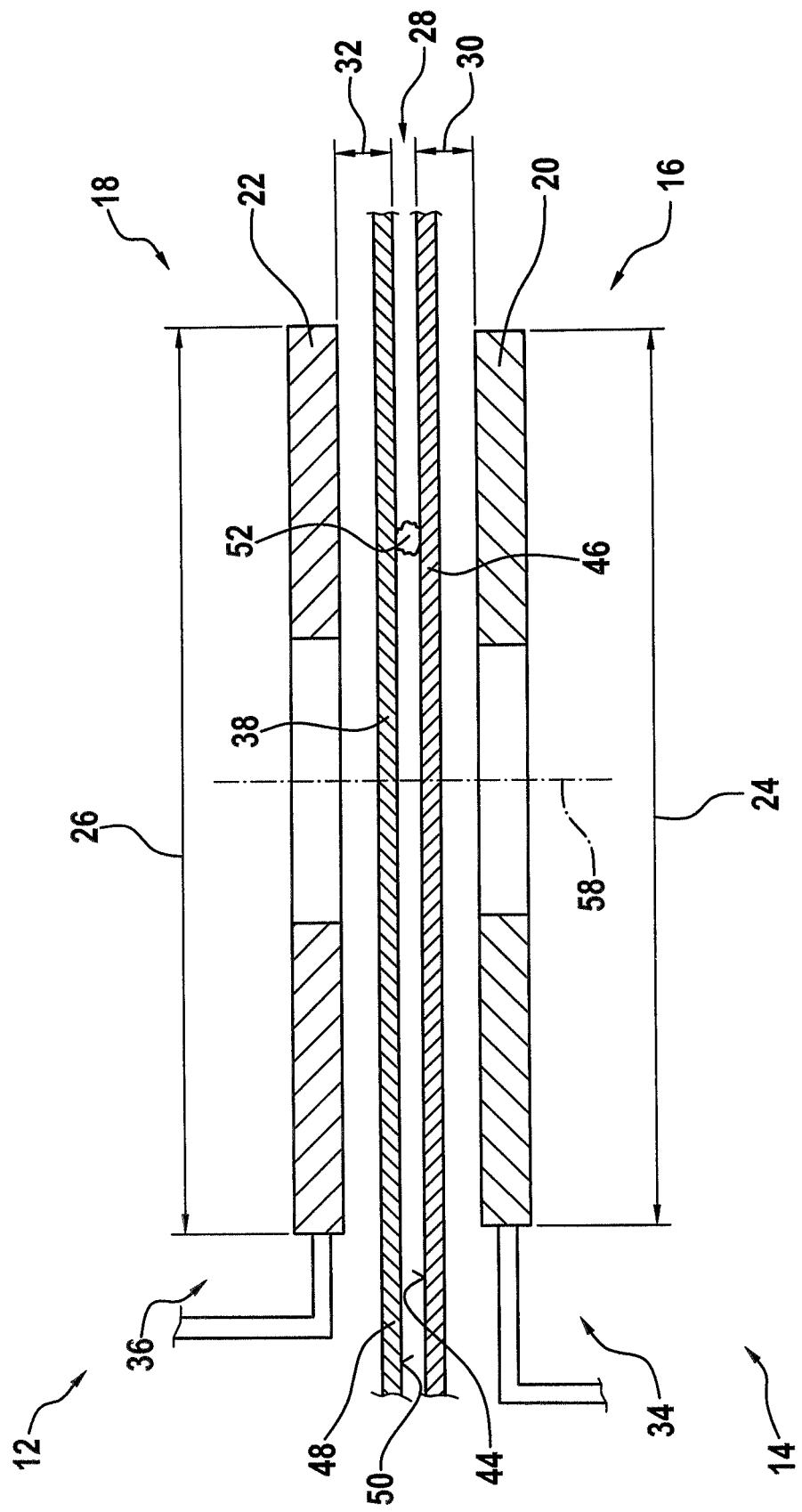
FIG. 3 shows a subsection of the system according to the present invention having the battery device, having the charging device and having a contact area in a charging operation, in a schematic sectional view.

In a charging operation, charging coil 22 of induction charging unit 18 of battery device 12 has a defined minimum clearance 32 with respect to contact area 28. Clearance 32 is formed by a distance from a side of charging coil 22 facing housing wall 48 to bottom surface 50. The distance is measured perpendicularly to bottom surface 50. A main extension plane of charging coil 22 extends parallel to bottom surface 50. In a charging operation, charging coil 20 of induction charging unit 16 of charging device 14 has a defined minimum clearance 30 with respect to contact area 28. Clearance 30 is formed by a distance from a side of charging coil 22 facing charging surface 44 to charging surface 44. The distance is measured perpendicularly to charging surface 44. A main extension plane of charging coil 20 extends parallel to the charging surface (FIG. 3).

A ratio between main coil extension 26 of charging coil 22 of induction charging unit 18 of battery device 12 and the minimum clearance 32 between charging coil 22 and contact area 28 is at most 30/1. The ratio between the main coil extension 26 and the minimum clearance 32 between charging coil 22 and contact area 28 is at least 7/1. The ratio between main coil extension 26 and minimum clearance 32 between charging coil 22 and contact area 28 is between 20/1 and 14/1. The ratio between main coil extension 26 and minimum clearance 32 between charging coil 22 and contact area 28 is approximately 17/1 (FIG. 3).

A ratio between main coil extension 24 of charging coil 20 of induction charging unit 16 of charging device 14 and minimum clearance 30 between charging coil 20 and contact area 28 is at most 30/1. Furthermore, the ratio between the main coil extension 24 and the minimum clearance 30 between charging coil 20 and contact area 28 is at least 7/1. The ratio between main coil extension 24 and minimum clearance 30 between charging coil 20 and contact area 28 is between 20/1 and 14/1. The ratio between main coil extension 24 and minimum clearance 30 between charging coil 20 and contact area 28 is approximately 17/1 (FIG. 3).

What is claimed is:

1. A system, comprising:
a battery device including a first induction charging unit that includes at least one first charging coil having a main coil extension; and
a charging device configured to transmit a charging energy inductively to the battery device, the charging device including a second induction charging unit that includes at least one second charging coil having a main coil extension;
wherein:
between the battery device and charging device is a gap delimited by a surface of the battery device and a surface of the charging device;
a ratio of (i) the main coil extension of the at least one first charging coil to (ii) a clearance between the at least one first charging coil and the surface of the battery device is at most 30/1;
a ratio of (i) the main coil extension of the at least one second charging coil to (ii) a clearance between the at least one second charging coil and the surface of the charging device is at most 30/1; wherein at least one of the ratios is at least 7/1.

2. The system as recited in claim 1, wherein at least one of the ratios is between 20/1 and 14/1.

3. The system as recited in claim 1, wherein the at least one second charging coil has a main coil extension of at least 50 mm.

4. The system as recited in claim 1, wherein the battery device is of a handheld tool.

\* \* \* \* \*